Feb. 3, 1959  E. P. WIGNER ET AL  2,872,401
JACKETED FUEL ELEMENT

Filed May 8, 1946  3 Sheets-Sheet 1

Witnesses:
Herbert E Metcalf
Robert S. Craig

Inventors:
Edward C. Creutz
Leo Szilard
Eugene P. Wigner
By Robert A. ————
Attorney Feb. 3, 1959 E. P. WIGNER ET AL 2,872,401
JACKETED FUEL ELEMENT
Filed May 8, 1946 3 Sheets-Sheet 3
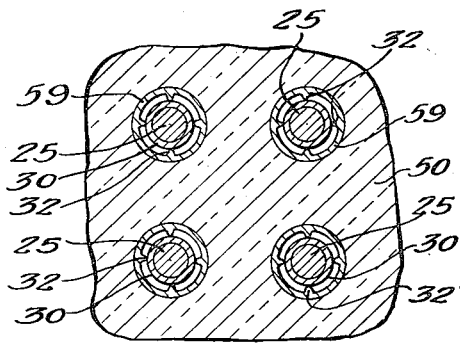
FIG.3.
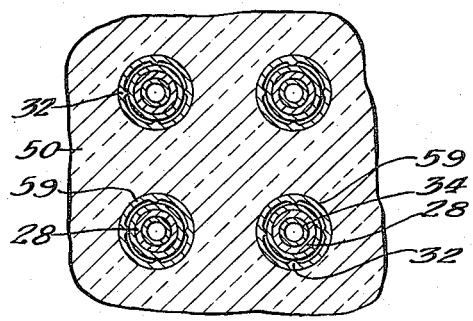
FIG.4.
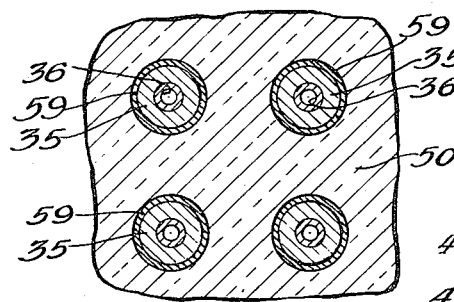
FIG.5.
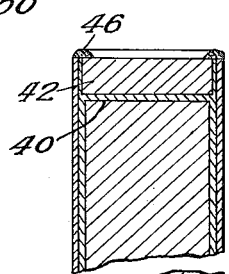
FIG.6.  FIG.7.
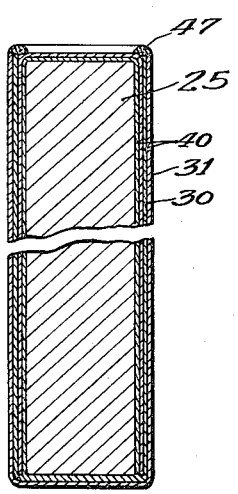
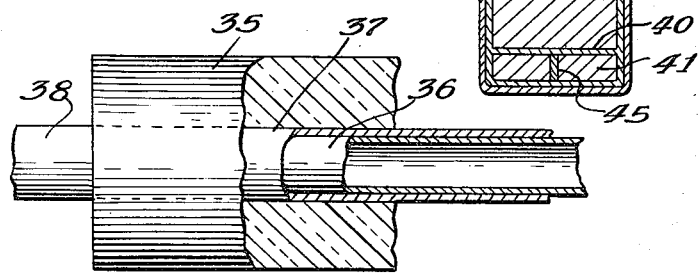
FIG.8.
Witnesses:
Herbert E. Metcalf
Robert S. Craig
Inventors:
Edward C. Creutz
Leo Szilard
By: Eugene P. Wigner
Attorney

United States Patent Office 2,872,401
Patented Feb. 3, 1959

2,872,401

JACKETED FUEL ELEMENT

Eugene P. Wigner and Leo Szilard, Chicago, Ill., and Edward C. Creutz, Pittsburgh, Pa., assignors to the United States of America as represented by the United States Atomic Energy Commission Application May 8, 1946, Serial No. 668,110

2 Claims. (Cl. 204—193.2)

This invention relates to neutronic reactors and to novel articles of manufacture used in and in combination with such reactors. In neutronic reactors a neutron fissionable isotope such as $U^{233}$, $U^{235}$, $94^{239}$ or mixtures thereof is subjected to fission by absorption of neutrons and a self-sustaining chain reaction is established by the neutrons evolved by the fission. In general such reactors comprise bodies of compositions containing such fissionable material, for example, natural uranium, disposed in a neutron slowing material which slow the neutrons to thermal energies. Such a slowing material is termed a neutron moderator. Carbon, beryllium, and $D_2O$ are typical moderators suitable for such use. Heat is evolved during the reaction which is removed by passage of a coolant through the reactor or in heat exchange relationship therewith. Specific details of the theory and essential characteristics of such reactors are set forth in Fermi et al. Patent 2,708,656, dated May 17, 1955.

In the operation of neutronic reactors at a substantial power, for example, 1000 kilowatts or more, for more than a few minutes difficulty has been encountered due to the fact that the moderator and/or coolant became radioactive during the operation of the reactor. This seriously complicates operation of the reactor since the radioactivity of the coolant and moderator may constitute a serious hazard to personnel.

It has been found that this difficulty may be substantially minimized by interposing a solid non-fissioning barrier between the fissioning isotope and the coolant or moderator or both. Notwithstanding the fact that introduction of non-fissioning isotopes into a neutronic reactor absorbs neutrons and therefore may tend to prevent establishment of a neutron chain reaction, it has been discovered that it is possible to insert non-fissioning barriers into the reactor, and to so proportion the thickness of the barrier to prevent passage of all or a preponderant amount of fission fragments from the fissioning isotope into the moderator and/or coolant while yet avoiding use of such a quantity of barrier that the neutron absorption thereof prevents establishment or maintenance of the neutron chain reaction. The barrier itself should be constructed of a material or materials having a low neutron capture cross-section as will be more fully explained hereinafter. Metallic aluminum and beryllium are particularly good materials for this purpose.

While the barrier may be interposed in various ways, a particularly advantageous structure involves the use of a non-fissioning enclosure about the fissioning isotope. An especially effective neutronic reactor may be constructed by providing a neutron moderator with spaced rods, tubes, or other convenient form of solid fissionable material enclosed in a non-fissioning enclosure and extending into or through the moderator.

In order to promote heat transfer from the fissioning isotope through the barrier to the contacting moderator and/or coolant, the barrier should be in close intimate contact with the fissioning composition. Generally, special precautions are observed for this purpose. Thus, a shell forming the non-fissioning barrier may be shrunk upon the fissioning component which preferably is in the metallic state. These enclosed fissionable components may be used as the active component of a neutronic reactor, and frequently are located in contact with a coolant such as a gas or liquid coolant for removal of heat from the reactor. Where the coolant has a corrosive effect upon the fissionable metal or other material, the non-fissioning sheath also serves to protect the fissionable material. In such a case, every precaution must be taken to prevent the existence of pores in the sheath through which the coolant may enter. Frequently sheaths are hermetically sealed about the fissionable material in order to seal the material from the coolant. In a particularly advantageous modification of the invention, the enclosed fissionable bodies are disposed within channels in the moderator through which the coolant is permitted to flow. This coolant may flow externally or internally or externally and internally of the fissionable component.

Not infrequently, difficulty is encountered in securing a satisfactory transfer of heat through the non-fissioning barrier or sheath. This is particularly true after prolonged operation of the reactor at various temperatures. In such a case the sheath may tend to shrink or otherwise become detached from the uranium or other fissioning component making heat transfer difficult.

In accordance with this invention, this difficulty may be substantially avoided by bonding the aluminum or similar sheath to the uranium by means of a suitable bonding agent. This bonding agent should be sufficiently ductile to withstand a tendency to crack or rupture due to thermal expansion of the uranium or other composition, and also should have a low neutron absorption cross-section. Beryllium, zinc and aluminum-silicon alloys have been found to be suitable where the operating temperature is not unduly high. The bonding layer not only serves to improve transfer of heat but also provides an additional protection against corrosion of the uranium or similar fissioning element by the coolant or moderator. The bonding layer also localizes any possibile corrosion by preventing travel of corrosive material along the surface of the fissioning element.

Accomplishment of the foregoing constitutes some of the principal objects and advantages of the invention, others of which will become apparent from the following description and drawings in which:

Fig. 3 is a fragmentary cross-sectional view through the reactor illustrating the relationship of the channels in the reactor of Fig. 1;

Fig. 4 is a fragmentary cross-sectional view similar to Fig. 3 and showing a modification thereof;

Fig. 5 is a fragmentary cross-sectional view similar to Figs. 3 and 4 but showing a further modification thereof;

Fig. 6 is a longitudinal sectional view of a fissionable body enclosed in a sheath of non-fissionable material wherein the sheath is bonded to the fissionable body;

Fig. 7 is a sectional view of a fissionable body enclosed in a double sheath of non-fissionable material; and Fig. 8 is a sectional view of a fissionable body having an internal sheath of non-fissionable material bonded thereto.

Figure 1:
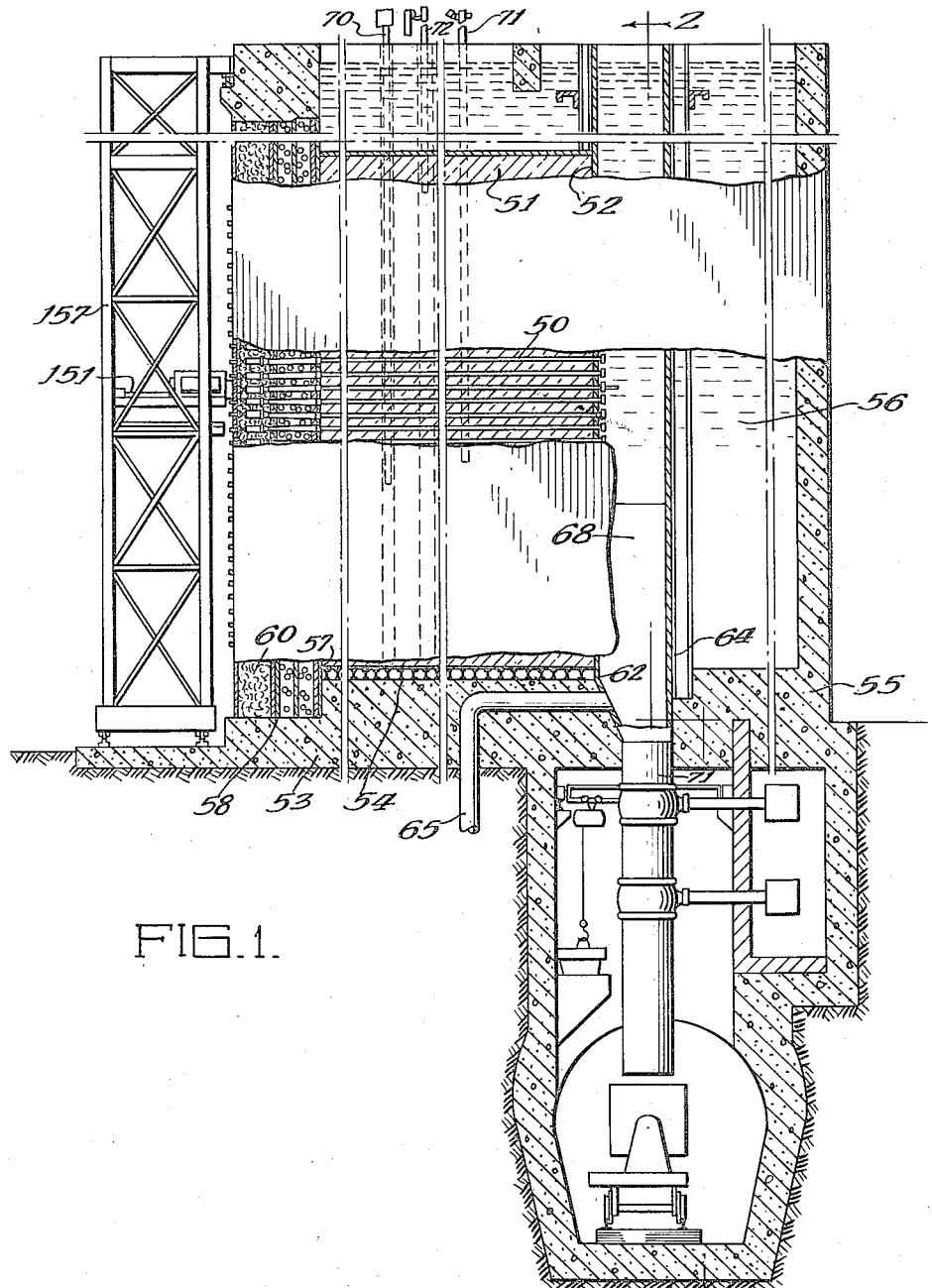
Fig. 1 is a diagrammatic longitudinal sectional view partly in elevation of a liquid cooled neutronic reactor.

In order that a self-sustaining neutronic chain reaction can be established and maintained, the losses of neutrons must be held to a value so low that at least one neutron is available for a new fission, after losses have been deducted, per neutron consumed in production of fission. In fission of $U^{235}$ and similar isotopes, more neutrons are evolved per fission than are required to produce the fission. For example, about 2.3 neutrons are evolved per neutron consumed in fission of $U^{235}$, and about 2.8 neutrons are evolved per neutron consumed in fission of $94^{239}$. These evolved neutrons are used up in fission of further $U^{235}$ or $94^{239}$ atoms or are lost. If losses do not reduce the ratio of neutrons evolved to neutrons consumed or lost below one, the chain reaction will continue.

Losses may be external, as when neutrons escape from the reactor, or internal. Internal losses are caused by absorption of neutrons by atoms which do not fission when the neutron has been absorbed.

$U^{238}$ present in natural uranium absorbs substantial quantities of neutrons to produce $94^{239}$. This loss may be substantially reduced by use of uranium aggregates. Thus, it has been found that $U^{238}$ absorbs neutrons to an appreciable degree at energies (resonance energies) greater than thermal energies due to its relatively high capture cross-section with respect to that of $U^{235}$ at such resonance energies. However, this type of absorption, known as resonance absorption, may be reduced by decreasing the amount of neutrons which pass into a uranium body until these neutrons have been slowed to thermal energy. This may be done by reducing the ratio of surface area per unit weight of uranium, i. e., by using natural uranium in the form of aggregates preferably having a minimum thickness of about 0.5 cm.

Neutron moderators also absorb neutrons. Generally speaking, it is desirable to use as a moderator an element (or compound thereof) of low atomic weight and low neutron capture cross-section. The ability to slow down neutrons may be expressed by what is known as the scattering cross-section whereas the ability to absorb or capture neutrons may be expressed as the capture cross-section. The ratio of absorption cross-section to scattering cross-section of various materials are approximately as follows:

| | |
|---|---|
| Light water ($H_2O$) | 0.00478 |
| Diphenyl | 0.00453 |
| Beryllium | 0.00127 |
| Graphite | 0.000726 |
| Heavy water ($D_2O$) | 0.00017 |

For natural uranium it is preferred to use materials wherein the above ratio is below about 0.004. However, with enriched uranium compositions containing more than natural amounts of $U^{235}$, a greater latitude is permissible. Using carbon or deuterium oxide as moderators and natural uranium as the fissionable composition, only about 1.1 or 1.3 respectively neutrons are obtained per neutron consumed due to neutron losses in the $U^{238}$ and the moderator. Since the external neutron losses may be substantial, other internal neutron losses should be held sufficiently low to prevent these losses from rising so high as to prevent the reaction.

Other components of the reactor including the coolant, impurities in the uranium, moderator, control or limiting rods, fission fragments, restraining barrier, etc. absorb neutrons in varying amounts depending upon their neutron capture cross-section.

The effect of these impurities or absorbers in a reactor containing natural uranium as the fissionable component has been approximately evaluated for each element as a danger coefficient. This coefficient is computed according to the formula $$\frac{\sigma_i}{\sigma_\mu} \cdot \frac{A_i}{A_u}$$

where $\sigma_i$ represents the cross-section for absorption of thermal neutrons of the impurity; $\sigma_\mu$ represents the cross-section for absorption of thermal neutrons of the uranium; $A_i$ represents the atomic weight of the impurity or neutron absorber; and $A_u$ represents the atomic weight of uranium.

The following table gives presently known values for various elements having their natural isotopic content.

| Element: | Danger Coefficient | Element: | Danger Coefficient |
|---|---|---|---|
| $H^1$ | 10 | Mo | 1.0 |
| $D^2$ | 0.01 | Ru | ~2 |
| He | 0 | Rh | 50 |
| Li | 310 | Pd | ~2 |
| Be | 0.04 | Ag | 18 |
| B | 2150 | Cd | 870 |
| C | 0.012 | In | 54.2 |
| N | 4.0 | Sn | 0.18 |
| O | 0.002 | Sb | 1.6 |
| F | 0.02 | Te | 1 |
| Ne | <3 | I | 1.6 |
| Na | 0.65 | Ze | <6 |
| Mg | 0.48 | Cs | 8.7 |
| Al | 0.30 | Ba | 0.30 |
| Si | 0.26 | La | <2.4 |
| P | 0.3 | Ce | <2.4 |
| S | 0.46 | Pr | <2.4 |
| Cl | 31 | Nd | ~17 |
| A | ~0.8 | Sm | ~1430 |
| K | 2.1 | Eu | 435 |
| Ca | 0.37 | Gd | ~6320 |
| Sc | <7 | Tb | ~20 |
| Ti | 3.8 | Dy | ~200 |
| V | 4 | Ho | ~10 |
| Cr | 2 | Er | ~40 |
| Mn | 7.5 | Tm | ~20 |
| Fe | 1.5 | Yb | ~10 |
| Co | 17 | Lu | ~30 |
| Ni | 3 | Hf | ~20 |
| Cu | 1.8 | Ta | 4.6 |
| Zn | 0.61 | W | 2.7 |
| Ga | ~1 | Re | ~18 |
| Ge | (<5) | Os | <1.7 |
| As | 2 | Ir | ~70 |
| Se | 6.3 | Pt | ~2.5 |
| Br | 2.5 | Au | 16 |
| Kr | <6 | Hg | 82 |
| Rb | ~0.4 | Tl | 0.5 |
| Sr | 0.57 | Pb | 0.03 |
| Y | 0.4 | Bi | 0.0025 |
| Zr | ~0.13 | Th | 1.1 |
| Cb | <0.4 | | |

From the above it will be apparent that certain elements would not be suitable as barriers in usual neutronic reactors. For example, cadmium, boron and gadolinium absorb neutrons to such an extent that they could not be used. On the other hand, aluminum and beryllium are typical of the elements which could be used although the amount thereof must be limited. For example, if a neutronic reactor is capable of supplying 1.06 neutrons per neuton consumed in fission when all losses exclusive of that caused by the sheath have been taken into account, then the loss due to the sheath can in no case exceed $$\frac{0.06}{0.30}$$

parts by weight per part of uranium or 20 percent of the weight of the uranium. These principles generally apply to other metals or materials for sheathing. Obviously where the sheath serves as a means for protection of the uranium, the resistance of the metal to corrosion and coolant impermeability must also be considered in selection of the sheath material.

From the above it will be apparent that for a neutron chain reaction to remain self-sustaining the equation $$n-x-y-z-L=1$$

where $n$=number of neutrons evolved by a fission of a fissionable isotope per neutron consumed by such isotope.

$x$=number of neutrons absorbed by a non-fissionable isotope such as $U^{238}$ in formation of a fissionable isotope per neutron consumed in fission.
$y$=number of neutrons absorbed by the moderator per neutron consumed in fission.
$z$=number of neutrons absorbed by other neutron absorbers per neutrons consumed in fission.
$L$=number of neutrons lost by leakage per neutron consumed in fission.

Thus, with $U^{235}$ the sum of $x+y+z+L$ cannot exceed about 1.3 and with $94^{239}$ cannot exceed about 1.8.

The ratio of the fast neutrons produced in one generation by the fissions to the original number of neutrons producing the fission in a system of infinite size from which there can be no loss is called the reproduction factor and is denoted by the symbol $k$. The $k$ constant of a system of finite size is the reproduction factor which the system would have if expanded to infinite size. Usually this constant is expressed without regard to localized neutron absorbers such as control or limiting rods, which are not uniformly dispersed throughout the entire system. The neutron reproduction ratio ($r$) is an actual value for a finite system, and differs from $k$ by a factor due to loss of neutrons through leakage and through absorption by localized neutron absorbers. To maintain a chain reaction, $r$ must be at least equal to one. As pointed out in the above-mentioned Fermi et al. patent, it is preferably maintained below about 1.01 during operation of the reactor.

Commutation of $k$ for any system may be determined experimentally in accordance with methods described in Fermi Patent 2,780,595, dated February 5, 1957.

The reproduction ratio ($r$) may be ascertained by observation of the rate of increase of neutron density. It may also be predicted by computation of losses due to local absorbers or leakage which may be deducted from $k$ to secure this value. In such a case allowance for leakage is made depending upon the size of the reactors. For reactors of practical size, leakage usually amounts to about 0.01 to 0.3 $k$ units depending upon the amount by which the $k$ of the system exceeds one. Loss due to other absorbers may be computed by computation of the danger sum as heretofore described.

Figure 2:
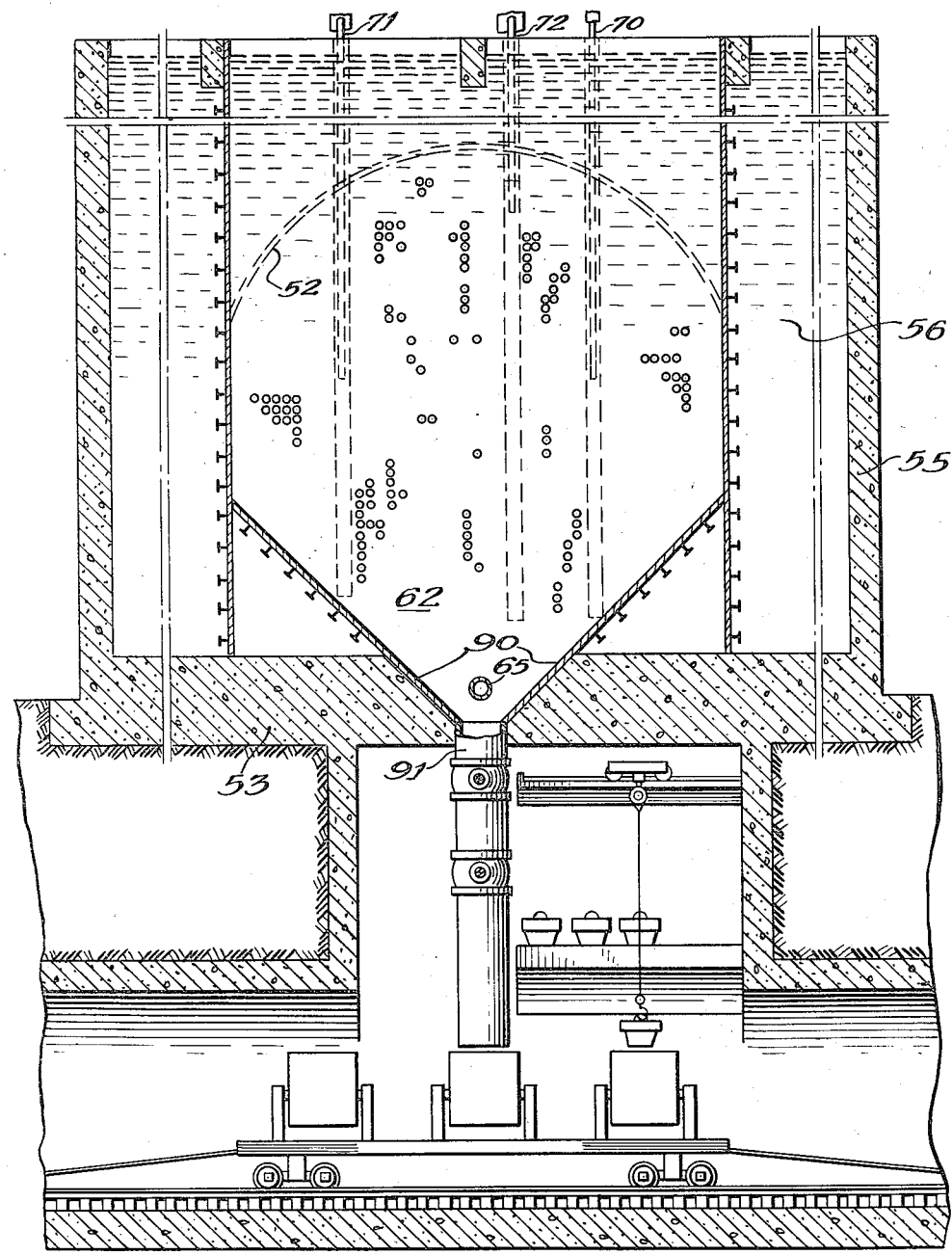
Fig. 2 is a vertical sectional view diagrammatically illustrating the reactor of Fig. 1 taken as indicated by the line 2—2.

The reactor shown in Figs. 1 and 2 comprises a more or less cylindrical structure 50 built of graphite blocks of high purity generally containing less than 0.02 $k$ units in impurities. The reactor is surrounded with a graphite reflector 51 forming an extension of the moderator and is enclosed by a fluid tight steel casing 52, supported on I-beams 54 within a concrete tank 55, erected on foundation 53. Tank 55 is preferably filled with water or other neutron absorber 56 to act as a shield for neutrons and gamma radiation.

The encased reactor is surrounded on all sides except one by the water 56, and the side not surrounded, which is to be the charging face 57 of the reactor is provided with a shield tank 58 filled, for example, with lead shot and water.

A backing wall 64 is placed in tank 55 spaced from outlet face 62 and forming tank 68 which may or may not be filled with water. Aluminum or similar metal coolant tubes 59 extend through the adjacent concrete wall 60, through shield tank 58, through the graphite moderator block 50 to an outlet face 62 of casing 52 to empty into tank 68. Only a few tubes 59 are shown in Fig. 1 for sake of clarity of illustration.

On the outside of tank 55 where the coolant tubes enter the reactor, the ends of coolant tubes 59 are removably capped, and are supplied with coolant under pressure from conveniently positioned manifolds (not shown). Thus water can be passed through tubes 59 to be discharged adjacent to outlet face 62 into tank 68. Water, after having passed through the reactor is removed through outlet pipe 65.

The coolant tubes 59 may be charged with aluminum jacketed uranium bodies, hereinafter described, by uncapping the tube to be loaded and pushing the fissionable bodies into the tubes in end to end relationship. The reactor can then be loaded with sufficient uranium to make the reactor operative to establish high neutron densities, the heat being dissipated by the coolant circulation. This coolant may be water, for example, from a source such as a river, passed once through the reactor, and then discarded, or, the water may be cooled and recirculated in a closed system. Diphenyl and other similar coolants may be used in lieu of water.

The principal dimensions of one reactor of the type described are as follows:

Axial length of active cylinder of reactor=7 meters
Radius of active cylinder of reactor=4.94 meters
Total weight of uranium metal in rods=200 metric tons
Weight of graphite in reactor=850 metric tons
Radius of uranium metal rods=1.7 centimeters
Thickness of aluminum jackets=0.5 millimeter
Thickness of aluminum pipe=1.5 millimeters
Thickness of liquid layer=2.2 millimeters with water or 4 millimeters of diphenyl
Number of rods in reactor=1695
Weight of aluminum in reactor=8.7 metric tons
Rod spacing in square array=21.3 centimeters The reactor is loaded from behind the shield from a loading car 151 mounted on traveling elevator 157. The car is aligned with the tube to be loaded and jacketed uranium segments pushed through the tube until the tube has been filled. Details of such loading operations are described in Young Patent 2,774,730, dated December 18, 1956.

The neutron density in the reactor is controlled by means of cadmium or boron clad aluminum rods or tubes which may be moved into or out of channels in accordance with the desired neutron density, and are diagrammatically illustrated at 70. Limiting or "Shim" rods 71 are also provided and generally are locked in place in order to prevent the neutron reproduction ratio from exceeding a safe value below about 1.01. Moreover, removable safety rods 72 are also provided to shut the reactor down by insertion of the rods therein in case of emergency. Both shim and safety rods are similar to the control rods in construction.

Tank 68 is provided with a bottom 90 which slopes toward the center leading to an outlet 91 for eventual discharge of the enclosed fissionable bodies.

The permissible location of the fissionable bodies in the tubes is diagrammatically illustrated in Figs. 3, 4 and 5. Thus, in Fig. 3, each coolant tube 59 encloses a plurality of relatively short uranium rods 25 each having a coating 30 of aluminum completely covering the surface thereof. The aluminum tube 59 is of a diameter sufficient to permit passage of coolant over the surface of the jacketed uranium rods. The tubes 59 are provided with internally extending longitudinal ribs 32 for centering the rods 25 in the tubes 59.

The structure illustrated in Fig. 4 is similar to that shown in Fig. 3 with the difference that the uranium tube 28 is substituted for the uranium rod 25. By forming the uranium in the shape of a tube, a coolant may be circulated internally of the uranium as well as externally thereby providing an additional heat transfer surface. The tube 28 is lined with a non-fissioning barrier 34.

It will be appreciated that the construction could be such that all the coolant passes through the interior of the tube. Figure 5 diagrammatically illustrates such an arrangement. The structure of Fig. 5 is similar to that shown in Fig. 4 with the difference that provision is made for passing all the coolant through the center of an uranium tube 35 which extends entirely through the moderator 50. The uranium tube may extend through the tube 59 or may be directly in contact with the moderator 50, omitting the aluminum tube 59. The uranium tube 35 is provided with an internal covering 36 in the form of an aluminum tube, extending entirely through the uranium tube 35 and also through the charging face 57 of the reactor and the outlet face 62, for conducting a circulating coolant to the uranium.

Inasmuch as the protecting coatings have the property of absorbing neutrons to some extent, it is desirable to maintain the quantity of the aluminum or other sheath within the pile at a minimum, in order to make possible a chain reaction therein as previously discussed. Consequenly, the thickness of the aluminum tubes and jackets should be maintained at the minimum required from the standpoint of strength, possible corrosion and erosion, and ability to restrain fission products to a substantial degree. Where the jacketed bodies are exposed directly to the attack of a corrosive coolant such as water, the jacket should be hermetically sealed in order to prevent leakage. Hermetically sealing of the uranium rods or tubes in very thin jackets of material having small resistance to neutron passage poses a problem rather difficult of solution. The thickness of the jackets for the uranium tubes may be generally of the order of 0.005 to 0.035 inch.

For convenience in handling the uranium rods or tubes, they are made in relatively short lengths, for instance, about 8 inches in length. Several methods for hermetically sealing a uranium body in a thin jacket of aluminum, stainless steel or similar material will be hereinafter described.

A jacketed fissionable body which is adapted to resist corrosion of the coolant as well as to restrain fission fragments is shown in Fig. 6. This assemblage comprises a uranium body 25 of circular cross-section disposed in a closely fitting can 30 of aluminum, beryllium, or other corrosive resistant metal of low neutron absorption, capable of use as a sheath, open at one end and bonded to the uranium by an intermediate interlayer 40. This intermediate layer completely envelopes the uranium. A conducting disc of aluminum or similar material 41 is located at the bottom of the uranium body, and is bonded to the bottom of the can and to the uranium by interlayer 40. A similar disc 42 of aluminum or other heat conducting material of low neutron capture cross-section 42 serves as a closure welded at 46 to the open end of the can.

The assemblage may be constructed in the following manner. A uranium rod of proper dimensions is shot blasted and the rod is dipped in molten zinc, containing one percent aluminum, for 90 seconds at a temperature of 440-470° C.

The interior of the aluminum can 30 is coated by brushing with a thin film of zinc to which approximately one percent of aluminum has been added. The disc 41 coated with the zinc is inserted in the coated aluminum can. A quantity of the molten zinc, containing about one percent aluminum composition is introduced into the can, and the disc 41 "tinned" with zinc is inserted in the can and forced to the bottom thereof. A hole 45 through disc 41 prevents entrapment of air below the disc during insertion. The can is placed in a tightly fitting steel sleeve which has been heated to approximately 450° C. Both the can 30 and the uranium rod 25 are placed in a suitable sealed container which is evacuated at the time the rod 25 is dropped or otherwise inserted into the can 30. This procedure assures that no air pockets will be included in the resulting bond. Thereupon the vacuum is released and the rod 25 mechanically forced toward the bottom of the can 30, displacing all excess zinc. The disc 42, previously coated with zinc, is then forced into contact with the uranium rod 25 displacing an additional quantity of molten zinc. The assembly is chilled and the outer edges of the can 30 and the disc 42 are machined down to a continuous flat end surface. The can is sealed to the disc 42 by an aluminum weld 46, thus hermetically sealing the uranium rod 25 in a jacket of aluminum.

The above mentioned bond is preferably as thin as possible, commensurate with ease of fabrication. As illustrated in Fig. 6 the relative thickness of the bond is greatly exaggerated. The lateral bond between rod 25 and can 30 may actually be 0.0035-0.005 inch or merely enough to permit displacement of molten zinc as the rod is inserted. The addition of approximately one percent of aluminum to the zinc adds to the ease of handling of the zinc. Corrosion of the molten zinc while handling is inhibited, and the fluidity is increased. Surface tension is reduced, thus aiding in wetting the surface of the uranium. The structure of the bond is also improved. The permissible amount of aluminum is capable of some variation as it has been found that the desirable results are attained with amounts varying from 0.1 to 3 percent.

Similar bodies may be produced using other bonding agents in lieu of zinc. For example, molten aluminum silicon alloy, zinc-tin, zinc-magnesium, zinc-antimony, zinc beryllium, or bismuth-tin or bismuth-lead alloys may be used to bond the sheath to the uranium or other fissionable body.

Referring to Fig. 7, a further modification is provided wherein a uranium rod 25 disposed in a closely fitting aluminum can 30 open at one end and bonded to the uranium by an intermediate layer 40. A second aluminum can 31, of slightly larger diameter than can 30, is bonded to the inner can, and to the end of the uranium rod not covered by the first can 30 by interlayer 40. The open end of can 31 is adjacent the closed end of can 30. The open end of can 31 is closed by a weld 47 forming in conjunction with the can 30, a hermetic seal for the uranium rod 25.

Although no conducting end caps are shown in the structure of Fig. 7, it will be understood that such end caps as illustrated in conjunction with Fig. 6 could be readily employed.

The method of applying the can 30 to the uranium rod 25 may be similar to that described in connection with Fig. 6 and may be repeated for applying the can 31. Instead of a zinc-aluminum bond, other metals or alloys may be employed. For instance the bond may be of 92 percent tin and 8 percent zinc with an initial "tinning" of zinc plus a small percentage of aluminum. Alternately other alloys or mixtures listed above may be used.

A further modification including a uranium tube adapted for use in the structure illustrated in Fig. 5 and having a protective coating on its interior surface only is shown in Fig. 8. In the illustrative embodiment a uranium tube 35, which is of a length to extend substantially through the moderator, is separated from the circulating coolant by an aluminum tube 36 and is bonded thereto by a layer 37 of an alloy containing bismuth. The tube 36 is provided with portions 38 adapted to extend beyond the moderator and to be connected to a suitable coolant circulating system. The bond may be applied by supporting the uranium tube 35 and the aluminum tube 36 coaxially in a vertical position, and filling the intervening space with bismuth alloy.

It has been found that an alloy containing 40 percent or more of bismuth will expand sufficiently on freezing to assure an intimate bond between a uranium body and a protective metallic cover thereon. Such alloy may be lead-bismuth, tin-bismuth, lead-tin-bismuth, or any of several other combinations of metals which expand upon cooling.

The invention is not confined to use with any specific type of neutronic reactor but may be used generally in all such reactors. For example, a neutronic reactor moderated with deuterium oxide may be constructed using a tank of aluminum 6 feet in diameter and 7 feet 4 inches high. In one such reactor 136 rods of uranium metal 1.1 inches in diameter and having an aluminum jacket 0.035 inch thick were mounted vertically in the tank to extend to within ¼ inch from the bottom of the tank. The reactor was surrounded with a 12 inch reflector of graphite. When 122.4 cm. of $D_2O$ containing less than 1 percent $H_2O$ was placed in the tank the reactor reached critical size. When 124.7 cm. of $D_2O$ was introduced the time for doubling of the neutron density therein was about 6.5 seconds.

In such a reactor coolant is not necessary since the liquid moderator ($D_2O$) may be withdrawn, cooled and returned to maintain the temperature of the reaction constant. By using the aluminum jacket on the uranium the tendency for the moderator to become radioactive is substantially reduced.

Numerous fissionable compositions may be used in accordance with the present invention. In addition to natural uranium metal, uranium compounds such as uranium oxide, or uranium carbide may be used. Moreover uranium containing more than natural concentrations of $U^{235}$ is suitable for neutronic reactors. Other suitable compositions include $U^{233}$, $U^{235}$, or $94^{239}$ taken alone or in combination with $U^{238}$ or $Th^{232}$, the isotopes being either in combined or elemental form.

Compounds of fissionable elements such as the oxide, carbide, carbonate, fluoride or similar compound may be used in lieu of the element in metallic state.

Many other variations of and applications for the invention will be apparent to those skilled in the art and the invention is, therefore, to be limited only by the scope of the appended claims.

What is claimed is:

1. A fuel element for use in a neutronic reactor, said fuel element comprising an homogeneous metallic uranium body completely enclosed and sealed in an aluminum cover, and a layer of zinc located between said body and said cover and bonding them to one another.

2. A fuel element to fit snugly in a first aluminum tube extending through a graphite moderator of a neutronic reactor, said fuel element comprising a single homogeneous body of uranium metal having a cylindrical bore therethrough, a second aluminum tube extending through the bore in said body, and adapted to extend beyond opposite ends of the moderator and to be connected to a coolant circulating system, and a layer of zinc located between said body and said second tube and bonding them to one another.

References Cited in the file of this patent

UNITED STATES PATENTS

| | | |
|---|---|---|
| 1,005,142 | Becker | Oct. 10, 1911 |
| 1,346,943 | Draper | July 20, 1920 |
| 1,552,017 | Sturges | Sept. 1, 1925 |
| 2,206,634 | Fermi et al. | July 2, 1940 |

FOREIGN PATENTS

| | | |
|---|---|---|
| 861,390 | France | Oct. 28, 1940 |

OTHER REFERENCES

Smyth: A General Account of the Development of Methods of Using Atomic Energy for Military Purposes Under the Auspices of the United States Government, 1940–1945, pages 83, 84, 103, 106 (1945), Supt. of Doc., Washington 25, D. C.